United States Patent [19]

Neyer

[11] Patent Number: 4,690,489
[45] Date of Patent: Sep. 1, 1987

[54] INTEGRATED OPTICAL WAVELENGTH MULTIPLEXER AND DEMULTIPLEXER DEVICE FOR MONOMODE TRANSMISSION SYSTEMS AND ITS USE

[75] Inventor: Antonius A. Neyer, Iserlohn, Fed. Rep. of Germany

[73] Assignee: U.S. Philips Corp., New York, N.Y.

[21] Appl. No.: 702,523

[22] Filed: Feb. 19, 1985

[30] Foreign Application Priority Data

Feb. 21, 1984 [DE] Fed. Rep. of Germany ....... 3406207

[51] Int. Cl.$^4$ ............................................. G02B 6/10
[52] U.S. Cl. ............................ 350/96.14; 350/96.13
[58] Field of Search ............... 350/96.11, 96.12, 96.13, 350/96.14, 96.15, 96.16

[56] References Cited

U.S. PATENT DOCUMENTS 4,196,964  4/1980  Papuchon ........................ 350/96.14

Primary Examiner—Eugene R. LaRoche
Assistant Examiner—Steven J. Mottola
Attorney, Agent, or Firm—Marc D. Schechter

[57] ABSTRACT

An integrated optical wavelength multiplexer/demultiplexer device for monomode systems is provided in order to fully utilize the large transmission capacity of monomode transmission systems. As shown in FIG. 1, the multiplexer/demultiplexer consists of a lateral two-mode strip waveguide, to which are connected, on both sides, two monomode strip waveguides. The wavelength selectivity of this element is attained by the different mode dispersions of the two modes capable of propagating in the two-mode strip waveguide. These modes are coupled to the monomode strip waveguides by adiabatic mode conversion. The element has a periodic wavelength dependence based on the operating principle of the two-mode interference. This dependence is utilized to construct compact multichannel multiplexer/demultiplexer devices in the form of cascaded, branching multiplexer/demultiplexer elements. In the manufacture of the multiplexer/demultiplexer, the wavelength dependence and the division ratio between the optical powers in the two output waveguides may be varied by means of numerous devices.

17 Claims, 11 Drawing Figures

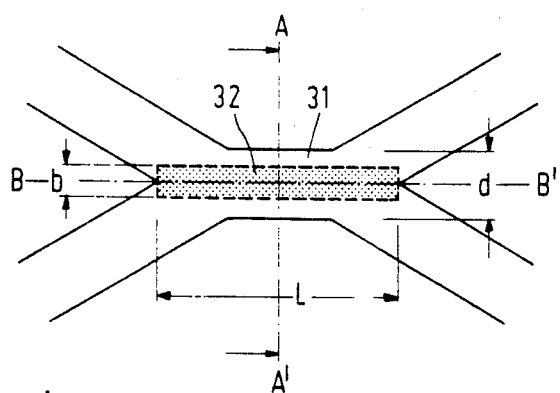
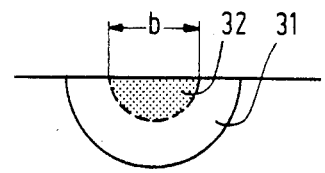
FIG.3a  FIG.3b
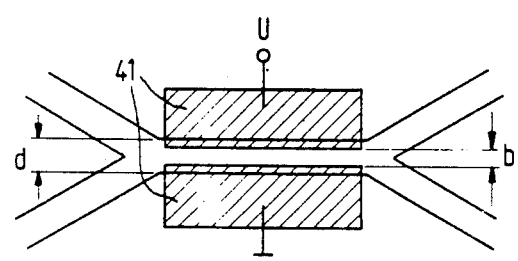
FIG.4a
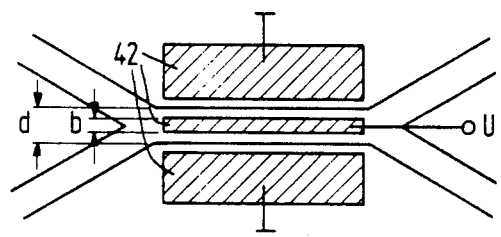
FIG.4b
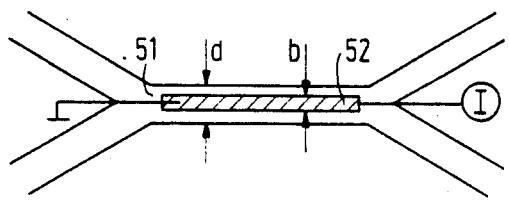
FIG.5

INTEGRATED OPTICAL WAVELENGTH MULTIPLEXER AND DEMULTIPLEXER DEVICE FOR MONOMODE TRANSMISSION SYSTEMS AND ITS USE

BACKGROUND OF THE INVENTION

The invention relates to an integrated optical wavelength multiplexer and demultiplexer for optical monomode glass fiber transmission systems and its use.

The full utilization of the transmission capacity of glass fiber transmission systems requires optical wavelength multiplexing and demultiplexing methods, briefly termed WDM (wavelength division multiplexing). In WDM, several different optical frequencies form several information channels which can be transmitted simultaneously without interference through one glass fiber.

For monomode optical transmission, WDM methods use micro-optical elements. (See, e.g. T. Uchida, et al. "Micro-Optic Devices For Optical Communications. 4th European Conference on Optical Communication, Geneva 1978, Contribution 8-1, pages 374–382 G. Winzer, et al. "Single-mode and multimode all-fiber directional couplers for WDM." *Appl. Opt.*, Vol. 20, No. 18, pages 3128–3135 (1981); M. Seki, et al "20-Channel Micro-Optic Grating Demultiplexer For 1.1–1.6 μm Band Using a Small Focusing Parameter Graded-Index Rod Lens." *Electron Lett.*, Vol. 18, No. 6, pages 257–258 (1982).) Alternatively, monomode WDM uses fiber optical elements. (See, e.g. M. Dignonnet, et al. "Wavelength multiplexing in single-mode fiber couplers." *Applied Optics*, Vol. 22, No. 3, pages 484–491 (1983); S. K. Sheem, et al. "Single-mode fiber wavelength multiplexer." *J. Appl. Phys.*, Vol. 51, No. 8, pages 4050–4052 (1980).) All these methods involve a comparatively great effort for the manufacture and the incorporation of the wavelength-selective elements and for the adjustment of the individual monomode fibers.

Because of these disadvantages, WDM devices have been examined in which integrated optical elements are used. The integrated optics permit manufacturing many wavelength-selective elements with the required monomode strip waveguides on one substrate, and moreover yield the advantages of manufacture according to planar technology. For WDM methods, especially two effects have been utilized by integrated optics: the wavelength-selectivity of the directional coupler with non-identical waveguides (R. C. Alferness, et al. "Tunable optical waveguide dirctional coupler filter." *Appl. Phys. Lett*, Vol. 33, No. 2, pages 161–163 (1978) and the great wavelength dependence of the TE-to-TM conversion (R. C. Alferness, et al. "Electro-optic waveguide TE-TM mode converter with low drive voltage." *Opt. Lett.*, Vol. 5, No. 11, pages 473–475 (1980)).

The disadvantages of the directional coupler reside on the one hand in the non-identical strip waveguides, which lead to different coupling efficiencies when coupling to glass fibers or suceeding cascade-connected directional couplers, and on the other hand in the necessity of dimensioning differently all the individual directional couplers in the case of a multi-channel WDM. Moreover, the large length of the directional coupler (~1 cm) and the low cross-talk damping obtained (−17 dB) militate against a cascade arrangement of several directional couplers for the use in a multichannel WDM.

The TE-to-TM converter has a shorter length (6 mm) and a higher cross-talk damping (20 dB), but it has the great disadvantage that it comprises only one strip waveguide and consequently does not permit either a spatial joining or a spatial separation of the spectrally decomposed signals. Thus, it is not suitable for multichannel WDM use or is only limited to the demultiplexer side.

SUMMARY OF THE INVENTION

It is an object of the invention to provide an integrated optical wavelength multiplexer/demultiplexer for monomode transmission systems, which can be used as a passive and electrically controllable element for multichannel WDM, and which does not exhibit the disadvantages inherent in the prior art devices.

According to the invention, this object is achieved in that the integrated optical wavelength multiplexer/demultiplexer comprises a lateral two-mode strip waveguide, to each side of which are connected two monomode strip waveguides.

BRIEF DESCRIPTION OF THE DRAWING

FIGS. 3a and 3b schematically show a wavelength multiplexer/demultiplexer with an additional impressed refractive index strip. FIG. 3a is a plan view, and FIG. 3b is sectional view on line A—A' of FIG. 3a.

FIGS. 4a and 4b schematically show electrode configurations by means of which the wavelength multiplexer/demultiplexer can be electro-optically tuned (i.e. on electro-optical substrates). In FIG. 4a the electrical field is parallel to the substrate surface. In FIG. 4b the electrical field is at right angles to the substrate surface.

FIG. 5 shows a thermo-optically tunable wavelength multiplexer/demultiplexer.

FIG. 6b graphically shows the power transmission characteristics of multiplexers I, II and III of FIG. 6a.

DESCRIPTION OF THE PREFERRED EMBODIMENTS

Figure 1A:
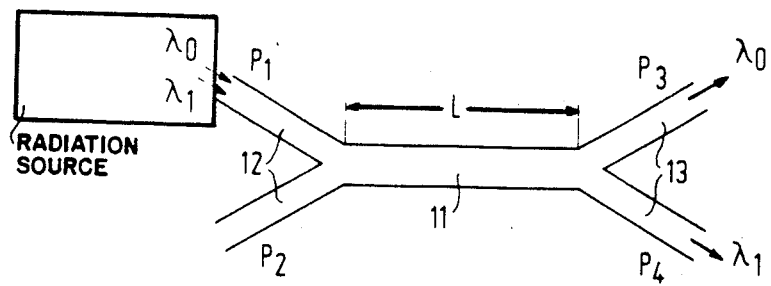
FIGS. 1a and 1b schematically show an integrated optical wavelength multiplexer/demultiplexer comprising one two-mode strip waveguide and four connected monomode strip waveguides.

The structure of the WDM device according to the invention is shown in FIG. 1. The core of this element is the lateral two-mode strip waveguide 11, whose wavelength-dependent mode dispersion is used for wavelength selection. The coupling substantially without any loss of the monomode strip waveguides 12 and 13 to the opposite ends of the two-mode strip waveguide 11 is achieved by tapered directional couplers, whose operation is described, for example, in the article by A. Neyer entitled "Electro-Optic X-Switch Using Single-Mode Ti:LiNbO$_3$ Channel Waveguides" (*Electron. Lett.*, Vol. 19, No. 14, pages 553–554 (1983).)

The operating principle of the indicated wavelength multiplexer/demultiplexer is based on the differential mode dispersion of the two-mode waveguide, i.e. on the different dependence of the phase constants of the fundamental mode ($\beta_0$) and of the first lateral fundamental mode ($\beta_1$) upon the wavelength $\lambda$. This fact has the consequence that both modes, after having passed through a path L of the wave guide 11, have a relative phase difference $\Delta\phi$, which depends in the following manner upon the wavelength $\lambda$:

$$\Delta\phi = (\Delta\beta + \gamma \cdot \Delta\lambda)L. \quad (1)$$

$\Delta\beta = \beta_0(\lambda_0) - \beta_1(\lambda_0)$ represents the difference of the phase constants at the operating wavelength $\lambda_0$, $\gamma$ represents the differential mode dispersion in the vicinity of $\lambda_0$ $$\gamma = \left\{ \frac{d\beta_1}{d\lambda}\bigg|_{\lambda_0} - \frac{d\beta_0}{d\lambda}\bigg|_{\lambda_0} \right\}. \quad (2)$$

and $\Delta\lambda = \lambda - \lambda_0$, represents the wavelength difference from $\lambda_0$.

On the assumption that the dispersion curves $\beta_0(\lambda)$ and $\beta_1(\lambda)$ in the vicinity of the operating wavelength $\lambda_0$ are approximately linear, a wavelength-dependent factor $\gamma$ is obtained. The relation between the relative phase difference $\Delta\phi$ between the two modes at the output of the two-mode waveguide and the division ratio of the optical power in the two monomode output waveguides is described extensively both in the aforementioned publication of A. Neyer and in German Patent Application No. P 3322508.7.

On the basis of these results, the ratios of the optical powers $P_3/P_1$ and $P_4/P_1$, where $P_1$ represents the input optical power and $P_3$ and $P_4$ represent the output optical powers, can be described by the relations $$P_3/P_1 \sim \cos^2[(\Delta\beta + \gamma \cdot \Delta\lambda) \cdot L/2]$$
$$P_4/P_1 \sim \sin^2[(\Delta\beta + \gamma \cdot \Delta\lambda) \cdot L/2] \quad (3)$$

The relation (3) has the following consequences:

(1) With a wavelength variation from $\lambda_0$ to $\lambda_1 = \lambda_0 + \Delta\lambda_\pi$ (with $$\Delta\lambda_\pi = \pi/\gamma L) \quad (4)$$

light input at port $P_3$ is completely passed at the wavelength $\lambda_1$ to the port $P_4$. This behavior as shown in FIG. 1a and is suitable for use as a wavelength demultiplexer.

Figure 1B:
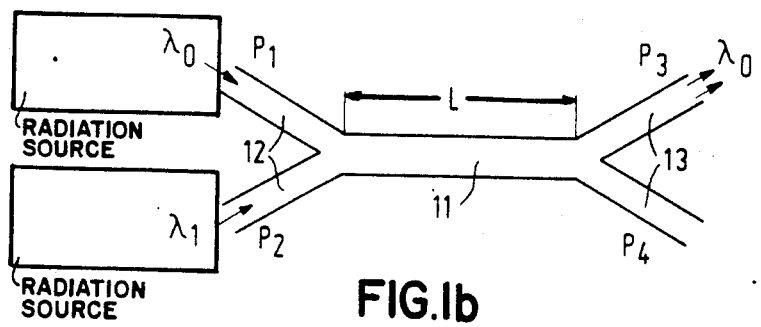

(2) The element is reciprocal and bidirectional. From this it follows that inputs and outputs can be interchanged without changing the transmission behavior. Thus, the element offers the possibility of being used as a wavelength multiplexer (FIG. 1b.)

(3) The wavelength multiplexer/demultiplexer is frequency- and wavelength-periodic. Thus, the wavelengths $$\lambda_n = \lambda_0 + n\Delta\lambda_\pi \quad (5)$$

(where n is an even integer) behave the same as the wavelength $\lambda_0$. The wavelengths $\lambda_m = \lambda_0 + m\Delta\lambda_1$ (where m is an odd integer) behave the same as the wavelength $\lambda_1$. This wavelength-periodical property distinguishes the indicated multiplexer/demultiplexer very clearly from the asymmetrical directional coupler and TE-to-TM converter. It offers the advantage described more fully below that a multichannel multiplexer can be obtained in the form of a "tree" structure.

(4) The wavelength difference $\Delta\lambda_\pi$, at which a complete interchange of the output optical powers takes place, can be attained on the one hand by varying the length L, or on the other hand by a modifying of the differential mode dispersion $\gamma$. Such a modification is very effective especially if a strip-shaped refractive index variation is produced in the two mode waveguide, as shown in FIGS. 3a and 3b This refractive index strip 32, whose width b is smaller than the width d of the strip waveguide 31, extends parallel and symmetrical to the axis B—B'. Due to this arrangement, the mode dispersion of the symmetrical mode is influenced considerably stronger than that of the antisymmetrical mode because it indicates in the range of the line of symmetry B—B' a zero passage of the field distribution. Thus, both a variation of the $\Delta\beta$ and a variation of the differential mode dispersion $\gamma$ are attained.

The refractive index strip described can now be manufactured on the one hand statically (for example by ion inplantation, ion exchange etc.). Alternatively, it can be produced by physical effects, such as for example the electro-optical effect. Thus, it is possible to tune the wavelength multiplexer/demultiplexer to a given wavelength difference $\Delta\lambda$, for example electric means. By means of the principle described in German Patent Application No. P 3322508.7, it is also possible to vary the $\Delta\beta$ (see equation 1) and thus to control, for example electrically, the optical division ratio $P_3/P_4$.

Two possible two-mode waveguide structures are shown schematically in FIG. 2.

Figure 2A:
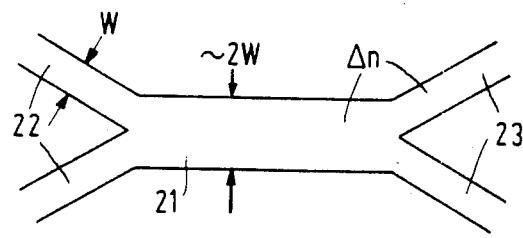
FIGS. 2a and 2b schematically show two embodiments of the invention: (a) a two-mode strip waveguide having a width nearly two times larger than the widths of the monomode waveguides, and (b) a two-mode strip waveguide having a maximum refractive index approximately two times larger than the maximum refractive index of the monomode strip waveguides.

In FIG. 2a, the waveguide 21 has the same maximum refractive index increase $\Delta n$ as the waveguides 22 and 23. However, waveguide 21 is so much wider ($\sim 2w$) that it conducts two modes.

Figure 2B:
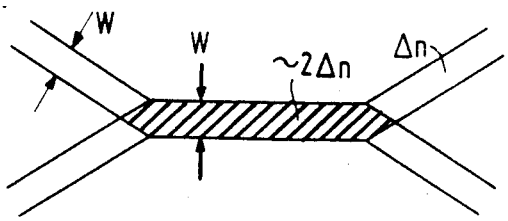

In FIG. 2b, the waveguide has the same width w as the waveguides 22 and 23, but it has a larger $\Delta n$ ($\sim 2\Delta n$) in order to guarantee the conduction of the two modes.

The first-mentioned structure is known as a BOA coupler. (M. Papuchon and A. Roy: "Electrically active optical bifurcation: BOA." *Appl. Phys. Lett.*, Vol. 31, No. 4, pages 266–267, August, 1977.) The second structure is based on the principle of the waveguide crossing with a double $\Delta n$ at the area of intersection (see the aforementioned article by A. Neyer). The simple manufacture of the wavelength multiplexer/demultiplexer from greatly different materials (for example glass, LiNbO$_3$, GaAs etc.) permits obtaining numerous novel contructions of the invention.

FIG. 4a shows a wavelength multiplexer/demultiplexer made of an electro-optical material. The largest electro-optical coefficient is parallel to the substrate surface, as is the case, for example, in Y- and X-cut LiNbO$_3$ and LiTaO$_3$ crystals, respectively. The two coplanar electrodes 41 are spaced a distance b, which is smaller than the waveguide width d.

By applying a voltage to these electrodes, the refractive index of the waveguide in the area between these electrodes is varied due to the electro-optical effect. Thus, the differential mode dispersion $\gamma(U)$ varies according to the applied voltage. $\Delta\lambda_\pi$ then varies according to the equation (4). Thus, by means of an applied electrical field, fluctuations in the laser wavelength or tolerances in the manufacture of the waveguides can be compensated electro-optically.

FIG. 4b shows a waveguide multiplexer/demultiplexer made of an electro-optical material, whose largest electro-optical coefficient is perpendicular to the substrate surface. This is the case, for example, in Z-cut $LiNbO_3$ and $LiTaO_3$ crystals. The width b of the central electrode of the structure 42 comprising three electrodes is smaller than the waveguide width d. By means of a voltage U applied to this electrode arrangement, the refractive index of the waveguide is varied especially below the central electrode based on the electro-optical effects.

FIG. 5 shows a wavelength multiplexer/demultiplexer made of a material which exhibits the thermo-optical effect, such as for example glass. (M. Haruna and J. Koyoma. "Thermooptic deflection and switching in glass." *Appl. Opt.*, Vol. 21, No. 19, pages 3461-3465, October, 1982. The nickel-chromium heating element 52 applied to the waveguide 51 has a width b, which is smaller than the width d of the waveguide. The current I passed through the heating element 52 produces, due to the thermo-optical effect, a refractive index variation in the waveguide. The refractive index is a maximum immediately below the heating element. This results in a current-dependent differential mode dispersion: $\gamma = \gamma(I)$.

Figure 6A:
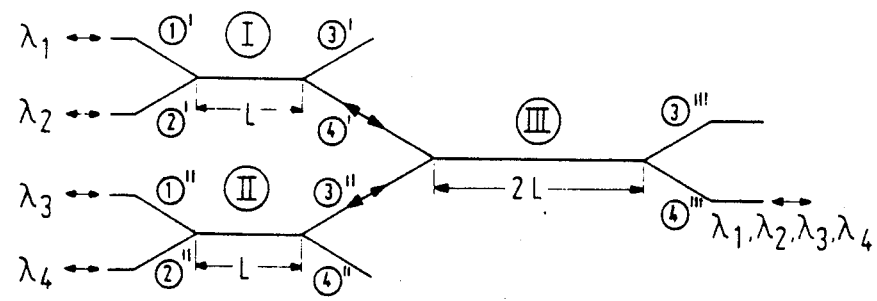
FIG. 6a schematically shows cascaded wavelength multiplexer/demultiplexers in a multichannel WDM device.

FIG. 6a shows the construction of a four-channel wavelength multiplexer/demultiplexer. For this purpose, two identical two-channel wavelength multiplexers I and II according to the invention are connected in parallel. Their outputs 4' and 3" serve as inputs to a third multiplexer III. The multiplexer III is distinguished from the multiplexers I and II in that its two-mode multiplexer waveguide has double the length (2 L).

Figure 6B:
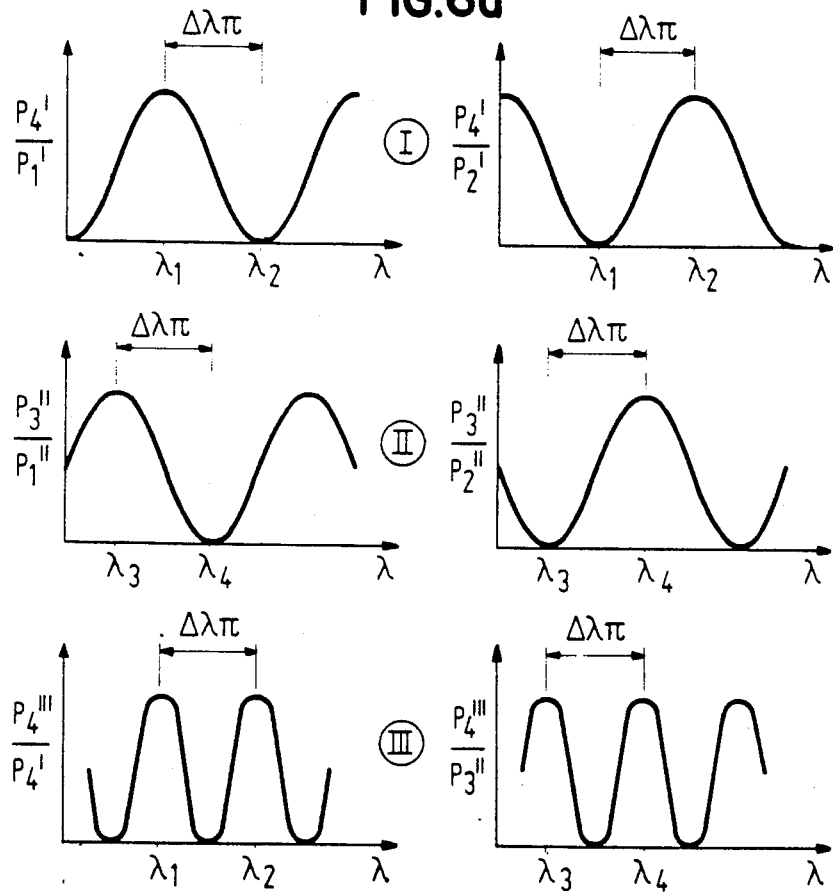

FIG. 6b shows the operating principle of the four-channel wavelength multiplexer/demultiplexer. Because of an identical dimensioning, the two multiplexers I and II have an identical $\Delta\lambda_\pi$. If now the wavelengths $\lambda_1$ and $\lambda_2$ are chosen so that their difference corresponds exactly to $\Delta\lambda_\pi$, both wavelengths according to the equations (3) and (4) appear at the output 4' of the multiplexer I.

The wavelengths $\lambda_3$ and $\lambda_4$ also appear at the same output of the multiplexer II when they differ exactly by $\Delta\lambda_\pi$. The transmission characteristic of the multiplexer II is adjusted electro-optically in a manner such that all the light of the wavelengths $\lambda_3$ and $\lambda_4$ is coupled out into the output arm 3".

As mentioned above, the multiplexer III has a length $L_{III}$ which is twice the length L of multiplexers I and II. Therefore, according to equations (3) and (4) the periodicity in $\lambda$ of multiplexer III is also two times larger.

This means that two optical wavelengths having the wavelength difference $\Delta\lambda_\pi = (\pi/\gamma L) = (2\pi/\gamma L_{III})$, which are coupled either into the input arm 4' or 3", appear at the same output arm of the multiplexer III. If the wavelengths $\lambda_1$ to $\lambda_4$ are now relatively offset so that the differences are $\lambda_1 - \lambda_3 = \lambda_4 - \lambda_1 = \lambda_2 - \lambda_4 = \Delta\lambda_\pi/2$, all these wavelengths are commonly coupled out into one of the two outputs 4''' or 3'''. The desired output channel can be selected electro-optically.

By cascading several structures shown in FIG. 6a, N-channel multiplexer/demultiplexer devices can be constructed. For this purpose, $N = 2^n$ (n = 1, 2, 3 etc.) wavelengths are either joined in one waveguide or are distributed over N waveguides substantially without any loss by means of n consecutively arranged multiplexer/demultiplexer stages according to the invention. The number of the parallel-connected multiplexer/demultiplexer devices in each stage decreases from $2^{n-1}$ in the first and last stages, respectively, to a single multiplexer in the last and first stages, respectively.

The length of the lateral two-mode multiplexer/demultiplexer strip waveguides on the other hand increases from L in the first and last stages, respectively, to $2^{n-1} \cdot L$ in the last and the first stages, respectively. Due to such a cascade arrangement, very low-loss and compact N-channel wavelength multiplexers can be manufactured.

I claim:

1. A wavelength multiplexer and demultiplexer device for combining radiation of wavelength $\lambda_0$ with radiation of wavelength $\lambda_1$, and for separating radiation of combined wavelengths $\lambda_0$ and $\lambda_1$ into radiation of wavelength $\lambda_0$ and separate radiation of wavelength $\lambda_1$, said device comprising:
   a two-mode strip waveguide having first and second opposite ends and having a length L from the first end to the second end;
   a first monomode strip waveguide optically coupled to the first end of the two-mode strip waveguide; and
   second and third monomode strip waveguides optically coupled to the second end of the two-mode strip waveguide;
   characterized in that the difference $\Delta\lambda$ between $\lambda_0$ and $\lambda_1$ is approximately equal to $n\pi/\gamma L$, where $\gamma$ is the differential mode dispersion of the two-mode waveguide in the vicinity of $\lambda_0$, and where n is an odd integer.

2. A wavelength multiplexer and demultiplexer device as claimed in claim 1, characterized in that:
   the monomode strip waveguides have substantially equal widths and substantially equal maximum increases in their refractive indices;
   the two-mode waveguide has a maximum increase in refractive index which is substantially equal to the maximum increase in refractive index of the monomode waveguides; and
   the two-mode waveguide has a width which is greater than the widths of the monomode waveguides.

3. A wavelength multiplexer and demultiplexer device as claimed in claim 2, characterized in that the two-mode waveguide has a central region with a refractive index and has a peripheral region with a refractive index which is less than the refractive index of the central region, the central region having a width which is less than the width of the two-mode waveguide.

4. A wavelength multiplexer and demultiplexer device as claimed in claim 3, characterized in that the central region is permanent.

5. A wavelength multiplexer and demultiplexer device as claimed in claim 3, further comprising thermooptic means for producing the central region.

6. A wavelength multiplexer and demultiplexer device as claimed in claim 3, further comprising electrooptic means for producing the central region.

7. A wavelength multiplexer and demultiplexer device as claimed in claim 1, characterized in that:
   the monomode strip waveguides have substantially equal widths and substantially equal maximum increases in their refractive indices;

the two-mode waveguide has a width which is substantially equal to the widths of the monomode strip waveguides; and the two-mode waveguide has a maximum increase in refractive index which is greater than the maximum increase in refractive index of the monomode waveguides.

8. A wavelength multiplexer and demultiplexer device as claimed in claim 7, characterized in that the two-mode waveguide has a central region with a refractive index and has a peripheral region with a refractive index which is less than the refractive index of the central region, the central region having a width which is less than the width of the two-mode waveguide.

9. A wavelength multiplexer and demultiplexer device as claimed in claim 8, characterized in that the central region is permanent.

10. A wavelength multiplexer and demultiplexer device as claimed in claim 8, further comprising thermooptic means for producing the central region.

11. A wavelength multiplexer and demultiplexer device as claimed in claim 8, further comprising electrooptic means for producing the central region.

12. A wavelength multiplexer device for combining radiation of wavelength $\lambda_0$ with radiation of wavelength $\lambda_1$, said device comprising:
 a two-mode strip waveguide having first and second opposite ends and having a length L from the first end to the second end;
 a first monomode strip waveguide optically coupled to the first end of the two-mode strip waveguide;
 second and third monomode strip waveguides optically coupled to the second end of the two-mode strip waveguide;
 means for injecting radiation of wavelength $\lambda_0$ into the second monomode strip waveguide; and
 means for injecting radiation of wavelength $\lambda_1$ into the third monomode strip waveguide;
 characterized in that the difference $\Delta\lambda$ between $\lambda_0$ and $\lambda_1$ is approximately equal to $n\pi/\gamma L$, where $\gamma$ is the differential mode dispersion of the two-mode waveguide in the vicinity of $\lambda_0$, and where n is an odd integer, whereby radiation of combined wavelengths $\lambda_0$ and $\lambda_1$ is coupled from the two-mode waveguide into the first monomode waveguide.

13. A wavelength demultiplexer device for separating radiation of combined wavelengths $\lambda_0$ and $\lambda_1$ into radiation of wavelength $\lambda_0$ and separate radiation of wavelength $\lambda_1$, said device comprising:
 a two-mode strip waveguide having first and second opposite ends and having a length L from the first end to the second end;
 a first monomode strip waveguide optically coupled to the first end of the two-mode strip waveguide;
 second and third monomode strip waveguides optically coupled to the second end of the two-mode strip waveguide; and
 means for injecting radiation of combined wavelengths $\lambda_0$ and $\lambda_1$ into the first monomode waveguide;
 characterized in that the difference $\Delta\lambda$ between $\lambda_0$ and $\lambda_1$ is approximately equal to $n\pi/\gamma L$, where $\gamma$ is the differential mode dispersion of the two-mode waveguide in the vicinity of $\lambda_0$, and where n is an odd integer, whereby radiation of wavelength $\lambda_0$ is coupled from the two-mode waveguide into the second monomode waveguide, and radiation of wavelength $\lambda_1$ is coupled from the two-mode waveguide into the third monomode waveguide.

14. A method of combining a radiation beam of wavelength $\lambda_0$ with a radiation beam of wavelength $\lambda_1$, said method comprising the steps of:
 providing a two-mode strip waveguide having first and second opposite ends and having a length L from the first end to the second end;
 providing a first monomode strip waveguide optically coupled to the first end of the two-mode strip waveguide;
 providing second and third monomode strip waveguides optically coupled to the second end of the two-mode strip waveguide;
 injecting radiation of wavelength $\lambda_0$ into the second monomode strip waveguide; and
 injecting radiation of wavelength $\lambda_1$ into the third monomode strip waveguide;
 characterized in that the difference $\Delta\lambda$ between $\lambda_0$ and $\lambda_1$ is approximately equal to $n\pi/\gamma L$, where $\gamma$ is the differential mode dispersion of the two-mode waveguide in the vicinity of $\lambda_0$, and where n is an odd integer, whereby radiation of combined wavelengths $\lambda_0$ and $\lambda_1$ is coupled from the two-mode waveguide into the first monomode waveguide.

15. A method of separating a combined radiation beam of wavelengths $\lambda_0$ and $\lambda_1$ into radiation of wavelength $\lambda_0$ and separate radiation of wavelength $\lambda_1$, said method comprising the steps of:
 providing a two-mode strip waveguide having first and second opposite ends and having a length L from the first end to the second end;
 providing a first monomode strip waveguide optically coupled to the first end of the two-mode strip waveguide;
 providing second and third monomode strip waveguides optically coupled to the second end of the two-mode strip waveguide; and
 injecting radiation of combined wavelengths $\lambda_0$ and $\lambda_1$ into the first monomode waveguide;
 characterized in that the difference $\Delta\lambda$ between $\lambda_0$ and $\lambda_1$ is approximately equal to $n\pi/\gamma L$, where $\gamma$ is the differential mode dispersion of the two-mode waveguide in the vicinity of $\lambda_0$, and where n is an odd integer, whereby radiation of wavelength $\lambda_0$ is coupled from the two-mode waveguide into the second monomode waveguide, and radiation of wavelength $\lambda_1$ is coupled from the two-mode waveguide into the third monomode waveguide.

16. A wavelength multiplexer and demultiplexer device for combining three radiation beams of wavelengths $\lambda_1$, $\lambda_2$, and $\lambda_3$, respectively, and for separating a radiation beam of combined wavelengths $\lambda_1$, $\lambda_2$, and $\lambda_3$ into separate radiation beams of wavelengths $\lambda_1$, $\lambda_2$, and $\lambda_3$, respectively, said device comprising:
 a first two-mode strip waveguide having first and second opposite ends and having a length L from the first end to the second end;
 a second two-mode strip waveguide having first and second opposite ends and having a length approximately equal to 2 L from the first end to the second end;
 first and second monomode strip waveguides optically coupled to the first end of the first two-mode strip waveguide;
 a third monomode strip waveguide having first and second ends, the first end of the third monomode strip waveguide being optically coupled to the first end of the second two-mode strip waveguide, the second end of the third monomode strip waveguide being optically coupled to the second end of the first two-mode strip waveguide;

a fourth monomode strip waveguide optically coupled to the first end of the second two-mode strip waveguide; and a fifth monomode strip waveguide optically coupled to the second end of the second two-mode strip waveguide.

17. A wavelength multiplexer and demultiplexer device as claimed in claim 16, characterized in that:

radiation of wavelength $\lambda_1$ is input or output through the first monomode waveguide, radiation of wavelength $\lambda_2$ is input or output through the second monomode waveguide, and radiation of wavelength $\lambda_3$ is input or output through the fourth monomode waveguide;

the difference $\Delta\lambda$ between $\lambda_1$ and $\lambda_2$ is approximately equal to $n\pi/\gamma L$, where $\gamma$ is the differential mode dispersion of the two-mode waveguides in the vicinity of $\lambda_1$, and where n is an odd integer; and the difference $\Delta\lambda'$ between $\lambda_1$ and $\lambda_3$ is approximately equal to $n\pi/2\gamma L$.

* * * * *